Figure 2:
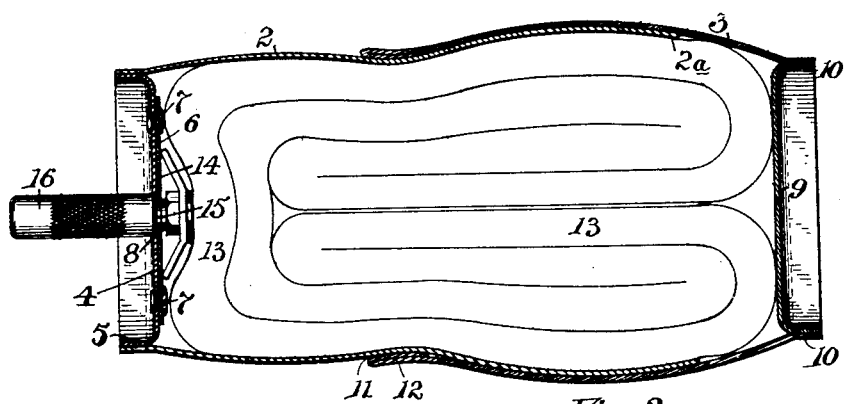

J. F. LUNGREN.
PROTECTIVE STORAGE CASING FOR INNER TUBES.
APPLICATION FILED MAR. 6, 1920.

1,387,549.

Patented Aug. 16, 1921.

INVENTOR.
John F. Lungren
BY
ATTORNEY.

UNITED STATES PATENT OFFICE.

JOHN F. LUNGREN, OF PHILADELPHIA, PENNSYLVANIA, ASSIGNOR OF ONE-HALF TO SAMUEL P. KENTWORTHY, OF PHILADELPHIA, PENNSYLVANIA.

PROTECTIVE STORAGE-CASING FOR INNER TUBES.

1,387,549.  Specification of Letters Patent.  Patented Aug. 16, 1921.

Application filed March 6, 1920. Serial No. 363,663.

*To all whom it may concern:*

Be it known that I, JOHN F. LUNGREN, a citizen of the United States, and resident of Philadelphia, county of Philadelphia, and State of Pennsylvania, have invented an Improvement in Protective Storage-Casing for Inner Tubes, of which the following is a specification.

The object of my invention is to provide a protecting casing for an inner tube of an automobile tire which will enable it to be stored in the automobile without injury, irrespective of the time it may remain unused in the car.

Heretofore, the extra inner tubes which are stored in the car for possible use in case of a blow out, are usually left in an exposed condition, folded up and placed within the box or compartment on the car in which the various articles that are required for repairs are stored, with the result that at the exposed bends, the inner tube becomes worn or cut. The jarring of the car in constant use causes the inner tube to abrade itself, not only in vibrating upon the floor or walls of the compartment in which it is placed, but also because of contact with vibrating tools and other articles within the compartment. In time, the inner tube is frequently so weakened at places that, when it is inserted in the shoe of the automobile wheel and blown up, a blow-out occurs before it has been used to any great extent. Sometimes the blow-outs occur almost as soon as the pressure is applied to the tire.

More specifically, my object therefore is to provide a suitable protective case in which the extra inner tube may be stored and carried about upon an automobile without the slightest danger of being injured by the jarring or other abusive action which naturally tends to come upon it during the ordinary running of the car.

In putting my invention into practice, I provide a multiple part storage casing of flexible material in which the inner tube is placed in a folded condition; and when inclosed within the casing, it is then blown up to a sufficient extent to prevent the walls of the tube having any freedom of movement relatively one to the other or to the walls of the casing, and in this manner there is no possible liability to abrasion, such as would be if there were sharp bends in the rubber and the tube were free. The air valve which is attached to the inner tube is extended through one end of the protecting casing and after the parts of the casing have been assembled over the folded inner tube, enough air pressure is blown into the tube to cause it to expand and fully fill out the space within the protecting casing, and in that manner insure that the inner tube not only expands the casing to some extent to insure the two parts thereof remaining in proper correlation, but that the tube itself shall expand sufficiently against the inner walls of the casing and also to such an extent as to cause the different folds of the tube to yieldingly rest one upon the other, whereby the entire length of the tube is more or less expanded in its said folded storage condition. In addition to being able to pack the tube within the protective casing, the casing itself is adjustable longitudinally in such manner that tubes of different lengths and sizes generally may be packed within the same casing, so that the casing is adapted to store inner tubes for various sized tires. The protective casing is preferably made of soft material in more or less tubular form and in two parts telescoping one within the other, so that they may be extended to any length to suit the various sizes of inner tubes to be stored within them. By use of a packing and storage device of the character herein set out, it is manifest that when the inner tube is blown up therein and expanded to a moderate extent, the device as a whole is pneumatic and may be thrown around in any manner in the automobile irrespective of the jarring or vibration to which it may be subjected, and there is no cutting or injury to the pneumatic tire itself, and hence it may be stored and protected in this manner for an indefinite period.

My invention also consists of improvements hereinafter described whereby the above objects and results are attained, said improvements comprising certain organization and combination of parts which are fully described hereinafter and more particularly defined in the claims.

Figure 3:
Figure 1:
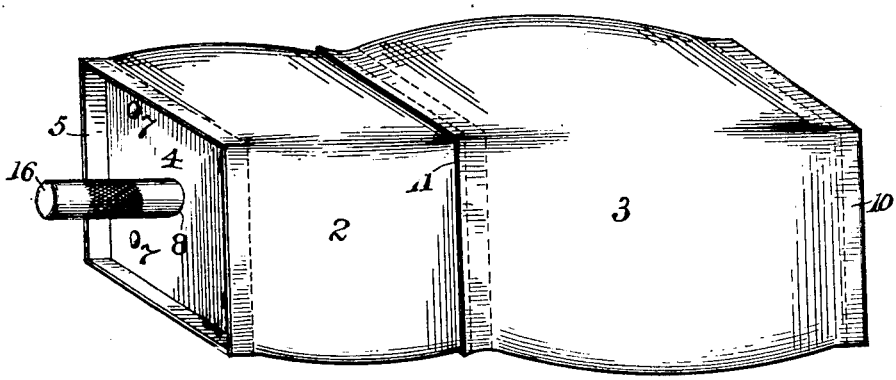
Figure 4:
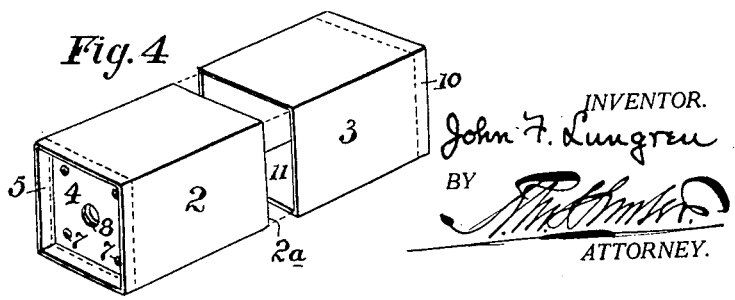

Referring to the drawing:

Figure 1 is a perspective view illustrating my improved storage casing for the pneumatic tire, expanded in condition such as it would have when the tire was packed therein and partly expanded; Fig. 2 is a longitudinal section thereof; Fig. 3 is a section of an edge of one part of the storage casing, illustrating a reinforcement thereof; and Fig. 4 is a perspective view of the two parts of the storage casing (without the inner tube) showing the said parts ready to be telescoped, one within the other.

2 is one part of the casing and 3 is the other part. Each of these parts may be made substantially rectangular in cross section, if so desired, or of any other shape in transverse section, so long as they are so formed that one may be inserted within the other in a telescopic manner. These parts 2 and 3 of the casing are each provided on their outer ends with heads. The part 3 is provided with the head 9 united at the rim 10, in such a manner as to give strength thereto against expanding. The other part 2 is provided with a head 4 which is similarly attached to the outer ends of the part 2 by the double rim 5 which also gives strength. This head 4 is further provided on the inside with a metallic plate 14 through the center of which a hole 8 is arranged, said hole extending also through the head 4. The plate 14 may be riveted to the head 4 by rivets 7, or attached in any other suitable manner. The heads 4 and 9 are preferably of pliable material such as is employed in the rest of the casing. A common material suitable for this purpose is imitation leather, such as pantasote, light oil cloth, or other materials of that nature which are water proof and more or less pliable.

In assembling the inner tube within the storage casing, the procedure is as follows: The inner tube 13 is preferably folded flat and the end folds again folded toward each other and the whole folded together in alinement with the pneumatic valve, in the manner indicated in Fig. 2; the air valve 15 thereof is extended through the opening 8 in the head 4 and plate 14, and the air pressure is applied sufficiently, whereby the inner tube is blown up to the partly expanded condition illustrated. In expanding, the inner tube will cause the protecting storage casing or cover to expand, and as the part 2 is telescoped into the part 3 to the desired extent, it will be seen that the expansion of the inner tube will cause the walls of the part 2 to press outward against the walls of the part 3 and in that manner cause them to bind upon each other. As the edge 12 of the part 3 is made heavier than the rest of the body thereof, it is manifest that the expansion at this point will not be as great as in the remaining portion and consequently there will be a slight annular neck or binding area provided which will prevent the two parts 2 and 3 separating after the inner tube has been expanded. In Fig. 3, I have indicated at 12ª a reinforcement of the free edge of the part or section 3, so that the open mouth 11 of that portion is practically non-expansible and in this manner insures the firm gripping of the two parts 2 and 3 when the inner tube is expanded. The free edge 2ª of the part 2 within the part 3 is left flexible so that it may adapt itself in expanding to fit tightly against the inner walls of part 3, as shown clearly in Fig. 2.

The function of the metal plate 14 is to reinforce the head 4 in such manner that when the inner tube is expanded, said plate will sustain the pressure of the saddle of the air valve 15, as shown in Fig. 1. This saddle is of the usual construction, such as used in tires generally, and its position in the storage receptacle is substantially the same as when used in tires, that is to prevent any undue strain coming upon the inner tube adjacent to the opening where the air valve passes through the felly or rim of the wheel. In the present case, it will protect the inner tube where the air valve passes through the aperture 8 in the head of part 2 of the casing. The air valve is shown with the protecting cap 16 screwed over its end, precisely as employed when the innner tube is installed in the tire and applied to the wheel.

It will be seen that the device as a whole is so pneumatic that it cannot become injured by storage in the automobile and, therefore, when it should become necessary to employ the inner tube, the same will be found to be in perfect condition. This is especially important where the automobile is driven over long and rough journeys and in districts where repair parts are not easily obtained. It is common practice with automobilists to overlook inspecting their extra inner tubes carried for emergency requirements in case of blow outs, and they, therefore seldom discover the injured condition of the tubes until the time arrives for actual use. By use of my invention no injury can result and hence inspection is not necessary.

The two parts 2 and 3 are extensible so as to provide greater or smaller length of casing to suit inner tubes for greater or less diameter of tire, and in this manner is adjustable. However, in the case of varying widths of tubes, the cross section of the casing is best made to approximately fit the width and hence in practice I prefer to provide casings of several cross sections having the adjustable length, and thereby meet all requirements for storage casings.

Broadly considered, my storage casing may be made in any suitable manner, irrespective of the form or number of parts, provided it be sufficiently large to permit the folded inner tube to be inclosed and partly blown up within it and so as to constitute a protective covering thereto.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. An extensible storage casing for inner tubes of automobile tires, comprising two telescoping portions respectively closed at one end and open at the other and providing soft pliable side walls extending from the closed end to the open end and telescopically arranged and expansible into frictional engagement, and in which the closed end of one of said portions is provided with a central aperture, the casing being adapted to receive a folded inner tube with the valve extending through the aperture and upon partial inflation expands the flexible walls of the telescoping portions into tight engagement.

2. The invention according to claim 1, further characterized by having the closed end about the aperture reinforced by a metal plate.

3. A storage casing for inner tubes of automobile tires which consists of a casing formed of two telescoping portions, each portion having an open end and a closed end and continuous side walls, the side wall and open end portions being telescoped and the closed end of one of said portions provided with an aperture, the two portions of the casing also formed of general rectangular shape at their closed ends and having their open ends pliable and adapted to bind when in telescoped engagement and expanded.

4. The invention according to claim 3, in which the pliable open end of the outermost portion is reinforced to resist expansion.

In testimony of which invention, I hereunto set my hand.

JOHN F. LUNGREN.